May 12, 1931.  E. T. HARRIS  1,804,981
OIL PRESSURE GAUGE
Filed June 18, 1928
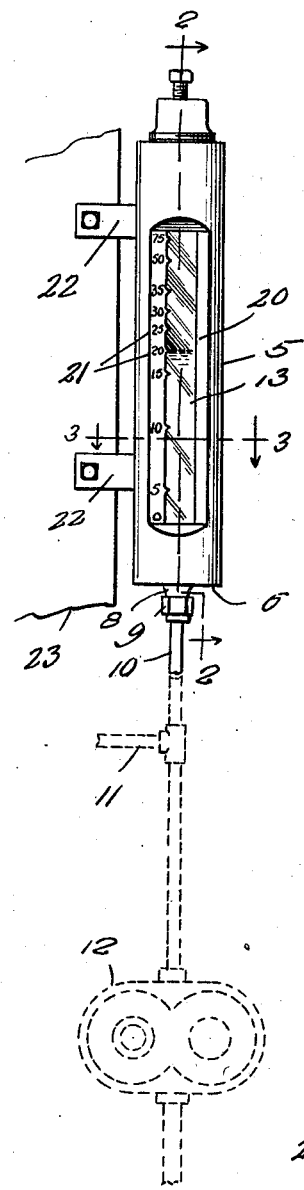
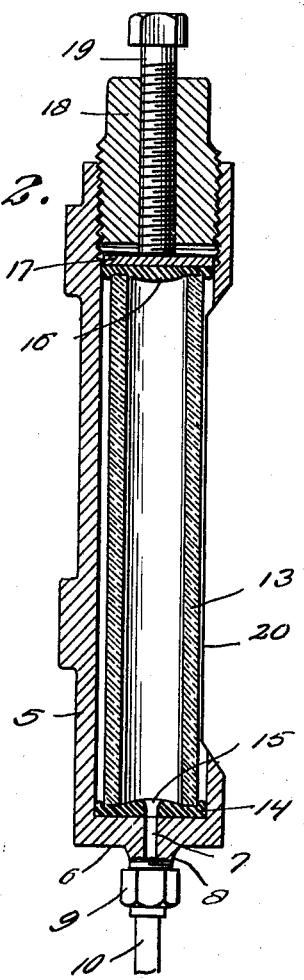
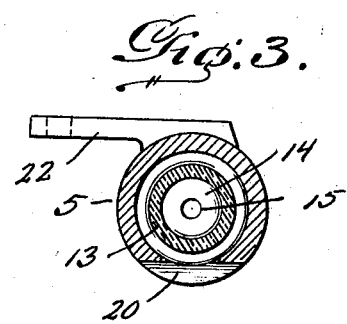
Inventor
E. T. Harris,
By J. Stanley Bunch
Attorney Patented May 12, 1931

1,804,981

UNITED STATES PATENT OFFICE

EWING THOMAS HARRIS, OF SEMINOLE, OKLAHOMA

OIL PRESSURE GAUGE

Application filed June 18, 1928. Serial No. 286,396.

This invention relates to a gauge designed primarily for indicating the pressure of oil in the circuit of a force feed lubricating system such as is used generally in the engines of motor vehicles and various other machinery.

The primary object of the invention is to provide a simple and efficient gauge for visually indicating the pressure of the oil in a lubricating system located at a point remote from the gauge.

A further object is to provide a gauge of the above kind which may be readily installed, and which has no mechanical working parts to get out of order.

Another object is to provide a gauge of the above character which may be economically manufactured and readily assembled.

Other objects will appear as the nature of the invention is better understood, and the same consists in the novel form, combination and arrangement of parts hereinafter more fully described, shown in the accompanying drawings and claimed.

In the drawings:

Figure 1 is a front elevational view of a gauge embodying the present invention, the gauge being connected to a lubricating system, a fragment of which is indicated by dotted lines.

Figure 2 is an enlarged central vertical section on line 2—2 of Figure 1; and

Figure 3 is an enlarged horizontal section on line 3—3 of Figure 1.

Referring more in detail to the drawings, the present gauge embodies a tubular metal casing 5 having a bottom wall 6 provided with a central inlet opening 7 and a depending inlet nipple 8 whose bore is coaxial with the opening 7. The nipple 8 is adapted to be coupled as at 9 to the end of a branch pipe 10, leading from the supply pipe 11 of a force feed lubricating system at the outlet side of the pump 12 by means of which the oil is circulated through such system under pressure.

The casing 5 has an open upper end to permit the downward insertion of a glass tube 13 therein, and this tube has its lower end seated on the margin of a yielding washer 14, of rubber or the like, which is disposed on the bottom wall 6 with its central opening 15 registering with the inlet opening 7 axially of the tube 13. Disposed on the upper end of the tube 13 is a yielding closure disk 16 of rubber or the like, and arranged on this closure disk is a rigid follower disk 17, preferably of metal and of a diameter greater than the internal diameter of the tube 13. A plug 18 is threaded in the upper end of the casing 5 and has an axial threaded bore receiving a set screw 19 whose lower end projects below the plug 18 and bears on the center of the follower disk 17. This set screw is threaded downwardly to tightly seat the lower end of the tube 13 on the washer 14 and to tightly seat the closure disk 16 on the upper end of said tube, thereby effectively preventing leakage of oil out of the tube and hermetically sealing the latter at its upper end.

The casing 5 is cut away at the front side to provide a longitudinal elongated sight opening 20 through which the tube 13 is exposed at one side for nearly its entire length.

When the oil is forced under pressure through the pipe 11 it will rise in the pipe 10 and enter the lower end of tube 13 which normally contains nothing but air. As the oil pressure increases, the oil is forced upwardly in the tube 13, compressing the air trapped ahead of the same in said tube. The portion of the oil forced upwardly in the tube 13 will thus act as indicating means to show accurately the pressure of the oil in the system. Suitable graduations 21 are provided on the casing 5 at one side of the sight opening 20, and along and close to the adjacent side of the exposed portion of the tube 13 for cooperating with the oil column in the latter to indicate clearly the degrees of pressure of the oil in the system. Obviously, the top of the oil column in the tube may be readily viewed through the opening 20 and read in conjunction with the graduations.

Suitable brackets 22 are provided on the casing 5 to provide for fastening the gauge to a suitable support 23, and as the pipe 10 may be of any desired length, the gauge may readily be mounted at a convenient point remote from the lubricating system and yet accurately indicate the oil pressure in the latter. Due to the form of the casing 5 and the mounting of the tube 13 therein, such tube is effectively protected from breakage.

Minor changes may be made without departing from the spirit and scope of the invention as claimed.

What I claim is:

An oil pressure gauge for force feed lubricating systems comprising a tubular metal casing having a bottom wall provided with a central inlet adapted for connection with the pressure line of the lubricating system, a packing washer provided with a groove and seated on the bottom wall of the casing, a transparent tube in the casing seated at its lower end in said packing washer groove, a closure disk provided with a groove on the upper end of said tube within the upper portion of the casing, a rigid follower plate disposed on the closure disk, a plug removably secured in the upper end of the casing, and a set screw threaded axially through said plug with its lower end projecting and engaging the follower plate to tightly and uniformly seat the tube in the washer groove and the groove of the closure disk on the tube when adjusted downwardly, said casing being cut away at one side to provide a sight opening through which said tube is exposed to view for the major portion of its length.

In testimony whereof I affix my signature.

EWING THOMAS HARRIS.